Patented Jan. 4, 1944

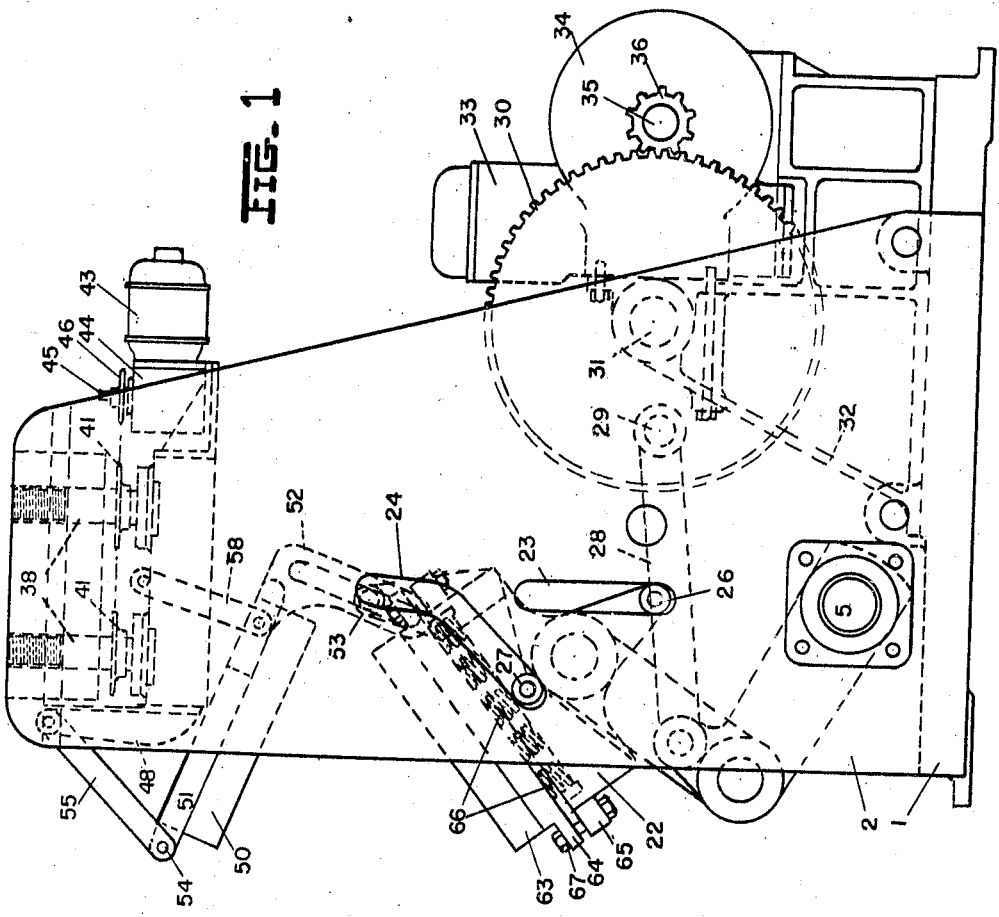

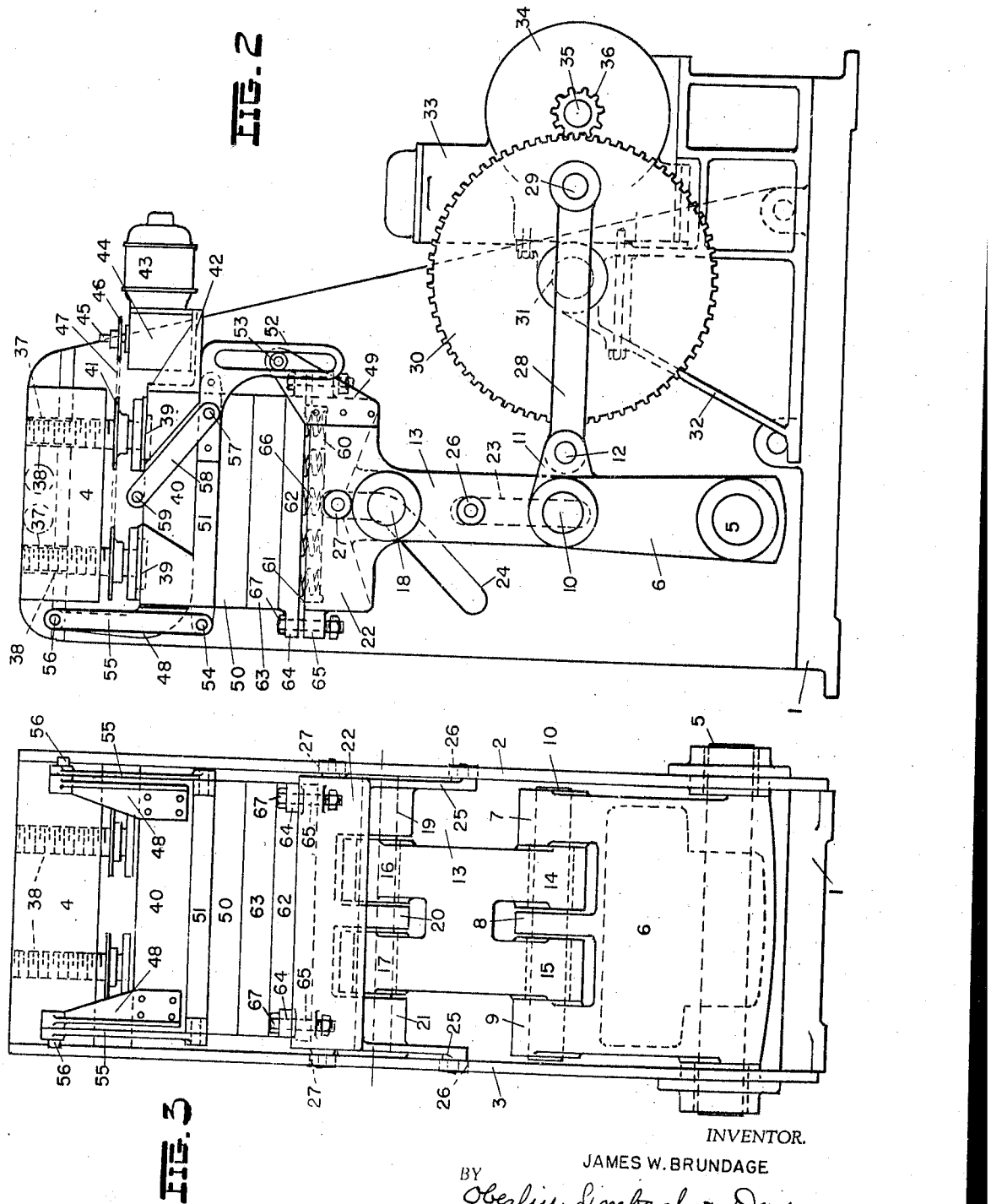

2,338,280

UNITED STATES PATENT OFFICE 2,338,280

VULCANIZER

James W. Brundage, Akron, Ohio, assignor, by mesne assignments, to The McNeil Machine and Engineering Company, Akron, Ohio, a corporation of Ohio Application April 19, 1940, Serial No. 330,578

7 Claims. (Cl. 18—17)

This invention relates as indicated to presses for the molding or curing of thermo plastic materials and for the curing or vulcanization of articles such as may be made from rubber or like materials.

Presses of the character described are usually provided with complementary mold sections adapted to be brought into and out of registry by the relatively movable heads of the press, so as to define a cavity therebetween within which the work is molded, cured, or vulcanized. When a hollow article is being vulcanized, such as, for example, a tire or an inner tube, the green or uncured article may be generally made sufficiently small so that the complementary mold sections may be tightly closed thereabout. Immediately the press is closed and the hollow article then expanded by internal pressure to fill the mold cavity. When, however, solid articles are being cured, a sufficient amount of stock is placed as an unshaped lump or as a partially shaped mass in the mold before the press is closed, and then plastic deformation of the stock relied upon to completely fill the mold cavity. Obviously in such case, a sufficient amount of stock must be provided to completely fill the mold cavity, and it is common practice to provide enough stock to slightly more than fill the mold in order to insure a perfectly formed article, the excess occurring as a rind around the article which is later removed.

When curing or molding articles of this kind, the stock is, in many cases, rather solid or inflexible until it has been softened by heating in the press. Difficulty is, therefore, encountered in closing the press tight at the outset of the curing or molding operation, since some time is required within which the thermo plastic material may soften and flow into the various parts of the curing or molding cavity, and thus permit the press to close.

It is a principal object of my invention to provide a press which is particularly suited for the performance of operations of the character described. However, as will be apparent from the resulting description of my invention, such apparatus may be used for allied purposes.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative however of but a few of the various ways in which the principle of the invention may be employed.

In said annexed drawings:

Fig. 1 is a side elevational view of a press constructed in accordance with the principles of my invention;

Fig. 2 is a side elevational view, similar to Fig. 1, but with one side of the press removed in order to more clearly illustrate the parts within the press; and Fig. 3 is an end elevational view of the press illustrated in Fig. 1 with the press in the closed position and the view taken from the left as viewed in Fig. 1.

Referring now more specifically to the drawings, the press comprises a base generally indicated at 1 which may be formed from a suitable casting or forging or built up from structural steel elements. Side plates 2 and 3 are rigidly secured to the base 1 and project upwardly therefrom in parallel relation. An upper head 4 is secured between the side plates 2 and 3. Journalled in the side plates 2 and 3 adjacent their lower ends is a transverse shaft 5 on which is mounted, intermediately of the side plates 2 and 3, a U-shaped toggle member generally indicated at 6. The toggle member 6 is provided with projecting legs 7, 8 and 9, these being provided with aligned openings in which is mounted a shaft 10. The toggle member 6 is provided with a lateral projection 11, in which is mounted a pin 12.

Mounted on the shaft 10 of the toggle member 6 is an upper toggle link 13 which, at its lower end, is provided with legs 14 and 15 having aligned openings embracing the shaft 10. The upper end of the toggle link 13 is provided with legs 16 and 17 which have aligned openings in which is mounted the shaft 18. The shaft 18 is carried by depending projections 19, 20 and 21 of the lower press head 22.

The side plates 2 and 3 are each provided with slots or elongated openings 23 and 24, the former being, in the embodiment of the invention illustrated in the drawings, a straight slot, and the latter being provided with angularly related components for the reasons hereinafter more fully explained. The lower press head 22 is provided with depending arms 25 which carry rollers 26. The rollers 26 are positioned in the slots 23. The lower press head 22 carries a second roller 27 on each side thereof, such rollers operating in the slots 24. The toggle linkage comprising the members 6 and 13 are actuated by means of a pitman 28, the forward end of which is rotatably connected with the shaft 12, and the rear end of which is rotatably connected with a pin 29 carried by a gear wheel 30. The gear wheel 30 is rotatably mounted on a shaft 31 supported on a bracket 32 carried by the base 1. The bracket 32 also supports a motor generally indicated at 33 and a speed reducing element generally indicated at 34. From the speed reducing element there projects a drive shaft 35 which carries a driving pinion 36 which meshes with the gear wheel 30. Suitable control mechanism will, of course, be provided for energizing the motor 33 so as to selectively drive the pinion 36 in opposite directions.

The upper press head 4 is provided with a plurality, preferably 4 equally spaced threaded openings 37 in which are threaded rods 38. The lower ends of the rods 38 are rotatably connected as at 39 to an auxiliary upper press head 40. Adjacent the lower ends of the rods 38, they are provided with sprocket wheels 41 secured thereto, and by which they may be turned and the auxiliary head accordingly moved relatively to the main upper head 4. The auxiliary head 40 carries a bracket 42 on which is supported a motor 43 and a speed reducing device 44. From the speed reducing device, a power shaft 45 extends in a direction parallel to the rods 38. The shaft 45 carries a sprocket wheel 46 which lies in the same plane as the sprocket wheels 41 of the rods 38. A chain 47 is trained about the four sprocket wheels 41, and also the sprocket wheel 46, so that rotation of the latter in either direction results in a consequent rotation in the same direction of the sprocket wheels 41 and the rods 38 resulting in an adjustment of the auxiliary head 40 with respect to the main head 4.

Projecting forwardly and upwardly from the auxiliary head 40 is a bracket 48. Projecting upwardly and rearwardly from the lower press head is a bracket 49. The upper platen 50 of the press is secured to and carried by a platen carrier 51. The platen carrier 51 is, at its rear edge, provided with a depending slotted bracket 52 engaging a roller 53 carried by the bracket 49 on the lower press head. The forward end of the platen carrier 51 is provided with a pin 54 to which is secured a link 55 which, at its opposite end, is secured to a pin 56 carried by the upper end of the bracket 48.

The platen carrier 51 is at opposite sides thereof provided with pins 57 to which are attached links 58 which, at their upper ends, are secured to pins 59 carried by the auxiliary press head 40.

The lower press head 22 is provided with a recess 60 on its upper face, such recess being substantially co-extensive with such face and bounded by a marginal flange 61. The platen carrier 62 to which is secured the lower mold section 63 is provided with laterally projecting ears 64 having an opening therethrough aligned with a similar opening in the laterally projecting ear 65 on the lower press head 22. Springs 66 are arranged at spaced points in the recess 60 of the lower press head, and bear against the platen carrier 62 to force such platen carrier and the lower press head apart. Such movement of the lower platen carrier 62 with respect to the lower press head 22 is adjustably limited by the bolts 67 which pass through the aligned openings in the projections 64 and 65.

The operation of the apparatus, the construction of which has been described above, is briefly as follows:

The press is shown in its open position in Fig. 1 and in this position it will be observed that the linkage which supports the upper platen carrier 51 maintains such platen and its associated mold section 50 forwardly of, and angularly related to, the position which it occupies when the press is closed as illustrated in Fig. 2. The toggle linkage and guide rollers associated with the lower press head similarly support it forwardly of, and angularly related to, the position which it occupies when closed as viewed in Fig. 2. When the press is open, the springs 66 force the platen carrier 62 away from the lower head by a distance as illustrated by the adjustment of the bolts 67. The press, in this position, can be readily cleaned and inspected and then loaded with raw stock to be molded or cured. The press is closed by rotating the pinion 36 in a counter-clockwise direction causing a clockwise rotation of the gear wheel 30. Rotation of the gear wheel 30 carries the pitman arm 28 to the right causing an extension of the toggle linkage 6 and 13, and an upward movement of the lower press head 22. Such upward movement is guided by the rollers 26 and 27 operating in the slots 23 and 24. During the first part of such upward movement of the lower press head, the roller 27, moving in the laterally extending portion of the slot 24, tips the head 22 rearwardly until the roller 27 enters that section of the slot 24 which is in alignment with the slot 23, whereupon, further closing movement of the lower head 22 will be along a line substantially normal to the parting plane of the mold sections.

As the lower press head 22 is being tilted rearwardly to bring it into parallelism with the upper head for final closing movement, the roller 53, carried by the bracket 49, operating in the slotted bracket 52, also moves the upper platen carrier 51 and its associated mold section 50 into parallelism and into abutting relation with the auxiliary upper head 40. Before the press is closed, the rods 38 will be adjusted by energization of the motor 43 so as to allow for the thickness of the mold sections 50 and 63 actually used between the press heads plus a space occupied therebetween by the work which is being molded or cured, so that when the mold sections move together to engage the stock, the resistance to such closing movement offered by the stock will compress the springs 66 until the lower platen carrier 62 has moved downwardly into substantial engagement with the marginal flange 61 on the lower press head. In other words, the rods 38 will be adjusted so that the parts will occupy this position when the toggle link 6 and 13 is strained out as viewed in Fig. 2. When the stock softens, due to heating or pressure or both, the lower mold section 63 will be moved upwardly into engagement with the upper mold section 50 under the influence of the springs 66, and the mold cavity tightly closed after which the curing or pressing operation proceeds for a predetermined length of time.

At the conclusion of the curing operation, the press is opened by rotation of the pinion 36 in a clockwise direction resulting in a counter-clockwise rotation of the gear wheel 30 and a movement of the pitman arm 28 to the left resulting in a collapsing of the toggle linkage 6 and 13 and a withdrawal of the lower press head and a tilting of both mold sections into the ultimate position illustrated in Fig. 1.

The various advantages and uses of the foregoing apparatus will be readily apparent to those skilled in the art so that a further enumeration thereof at this point is believed unnecessary.

Other modes of applying the principle of the invention may be employed, change being made as regards the details described, provided the features stated in any of the following claims or the equivalent of such be employed.

I therefore particularly point out and distinctly claim as my invention:

1. In a curing press, the combination of paired relatively movable press heads, paired mold sections carried by said heads and adapted to be moved thereby into and out of mating relation, one of said heads comprising a stationary section, a movable section, and means connecting said movable section to said stationary section for adjusting the position of the same along a line substantially normal to the mating plane of said mold sections, means mounting one of said mold sections on said movable section for swinging movement from a molding position to a position angularly inclined with respect to the mating plane of said mold sections, and means interconnecting said press heads adapted to move said last named mold section back and forth between said positions as said heads are operated to move said sections into and out of mating relation.

2. In a curing press, the combination of paired relatively movable press heads, paired mold sections carried by said heads and adapted to be moved thereby into and out of mating relation, one of said heads comprising a stationary section, a movable section, and means connecting said movable section to said stationary section for adjusting the position of the same along a line substantially normal to the mating plane of said mold sections, means mounting one of said mold sections on said movable section for swinging movement from a molding position to a position angularly inclined with respect to the mating plane of said mold sections, comprising a plurality of links respectively having pivotal connections with said last named mold and movable sections, and means interconnecting said press heads adapted to move said last named mold section back and forth between said positions as said heads are operated to move said sections into and out of mating relation.

3. Apparatus as claimed in claim 1, wherein said connecting means comprises a plurality of screws together with means for simultaneously moving all of such screws in the same direction.

4. Apparatus as claimed in claim 1 wherein said movable section serves as a platen abutment for the mold section connected thereto when such mold section is in molding position.

5. In a curing press, the combination of paired relatively movable press heads, paired mold sections carried by said heads and adapted to be moved thereby into and out of mating relation, one of said heads comprising a stationary section, a movable section, and means connecting said movable section to said stationary section for adjusting the position of the same along a line substantially normal to the mating plane of said mold sections, means mounting one of said mold sections on said movable section for swinging movement from a molding position to a position angularly inclined with respect to the mating plane of said mold sections, means resiliently mounting the other of said mold sections on the other of said press heads for limited movement with respect thereto along a line normal to the mating plane of said mold sections, said other head being adapted to engage with and limit movement of said other mold section when said heads are operated to move said mold sections to molding position, said resilient means being operative to thereafter effect movement of said other mold section into mating engagement with said first mold section, and means interconnecting said press heads for moving said first named mold section back and forth between said positions upon movement of said heads toward and away from each other.

6. In combination, a pair of coacting press heads adapted to receive a pair of coacting mold parts, a pressure plate disposed within one of the heads, a plurality of spaced threaded spindles connected to said plate, said spindles being mounted in one of said heads and means connecting all of the spindles for moving them collectively, whereby the pressure plate may be adjusted with respect to the head.

7. In a curing press as described, the combination of a stationary head including an adjustable support for a platen; a platen carried on said support by linkage which permits face to face engagement of said platen with said support and permits movement of said platen laterally to a position in tilted relation to said support; a mold section mounted on said platen in parallel relation thereto; a second mold section adapted to matingly engage said first mold section; a second platen operative to support said second mold section in mating engagement with said first mold section, which second platen is resiliently supported upon a movable head; said movable head; means operative to move said movable head toward and away from said stationary head on a line normal to the mating plane of said mold sections, and operative to move same from retracted position to a position tilted in relation to the normal line of retraction; a bracket mounted in fixed relation with said platen and mold section supported on said stationary head; a second bracket supported on said movable head; a cam slot in one of said brackets positioned parallel to the normal line on which said movable head is retracted; and a cam mounted on the other bracket operatively engaging said slot, whereby retraction of said movable head on such normal line does not affect the platen carried by said stationary head.

JAMES W. BRUNDAGE.